(12) United States Patent
Matousek et al.

(10) Patent No.: US 9,820,442 B2
(45) Date of Patent: Nov. 21, 2017

(54) THREE-SECTION CONCAVE AND ADJUSTMENT MECHANISM FOR AN AGRICULTURAL HARVESTING COMBINE

(71) Applicant: Tribine Industries LLC, Logansport, IN (US)

(72) Inventors: Robert A. Matousek, Valley Center, KS (US); Bryan S. Claerhout, Hesston, KS (US)

(73) Assignee: Tribine Industries LLC, Logansport, IN (US)

( * ) Notice: Subject to any disclaimer, the term of this patent is extended or adjusted under 35 U.S.C. 154(b) by 22 days.

(21) Appl. No.: 14/967,691

(22) Filed: Dec. 14, 2015

(65) Prior Publication Data

US 2017/0164559 A1    Jun. 15, 2017

(51) Int. Cl.
| | |
|---|---|
| *A01F 12/26* | (2006.01) |
| *A01F 12/28* | (2006.01) |
| *A01F 7/06* | (2006.01) |
| *A01F 12/22* | (2006.01) |
| *A01D 69/00* | (2006.01) |

(52) U.S. Cl.
CPC ............ *A01F 7/067* (2013.01); *A01F 7/062* (2013.01); *A01F 12/26* (2013.01); *A01F 12/28* (2013.01); *A01D 69/00* (2013.01); *A01F 7/06* (2013.01); *A01F 12/22* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,053,148 | A | * | 9/1936 | James ................. | A01F 7/06 209/398 |
| 3,589,111 | A | * | 6/1971 | Gullickson ........... | A01F 7/06 460/67 |
| 4,284,086 | A | * | 8/1981 | Williams ............. | A01F 7/062 460/150 |
| 4,330,000 | A | * | 5/1982 | Peiler .................. | A01F 12/28 460/109 |
| 4,440,179 | A | * | 4/1984 | Bassett ............... | A01F 12/16 209/660 |

* cited by examiner

*Primary Examiner* — Alicia Torres
(74) *Attorney, Agent, or Firm* — Mueller Law, LLC; Jerry K. Mueller, Jr.

(57) ABSTRACT

A rotor and cage assembly includes a skeleton of curved spaced-apart side members affixed to laterally extending upper and lower spaced-apart members therebetween and surrounding the rotor. One of the curved spaced-apartside members is terminated with curved fingers. Three concave inserts insert laterally into the skeleton spanning 270° around the rotor. One of the concave inserts carries straight fingers that interlace between the skeleton side member curved fingers. A control assembly of plates having arcuate slots placed at 3 of the pivots of the skeleton assembly, control bars connected to the skeleton pivots, and an actuator connect to the control bars at one end effect arcuate rotation of the control bars resulting in the synchronized rotation of the arcuate slotted plates so that the interlaced straight fingers move closer together or farther apart with the fixed skeleton assembly curved fingers for different types of grain.

24 Claims, 18 Drawing Sheets

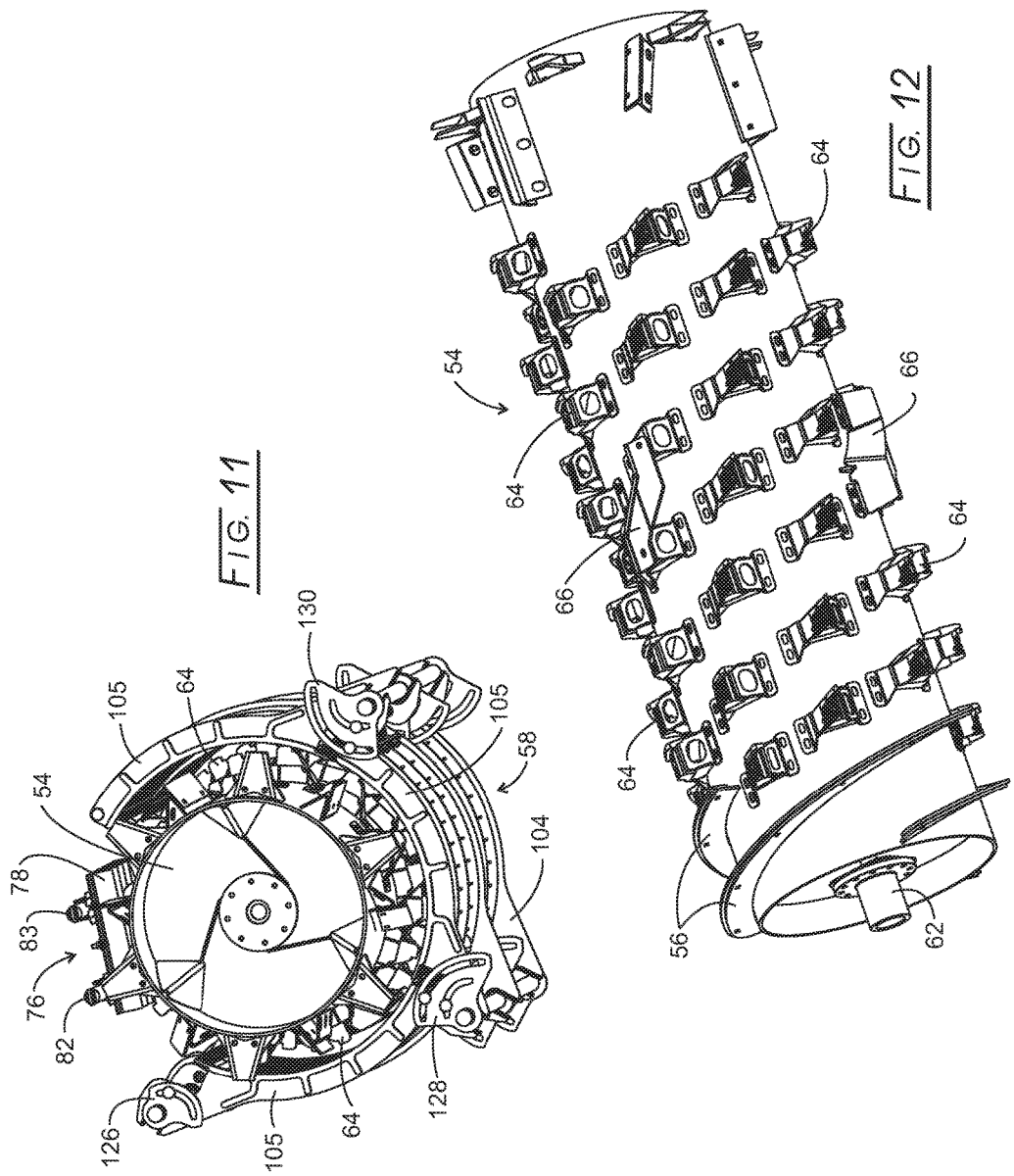

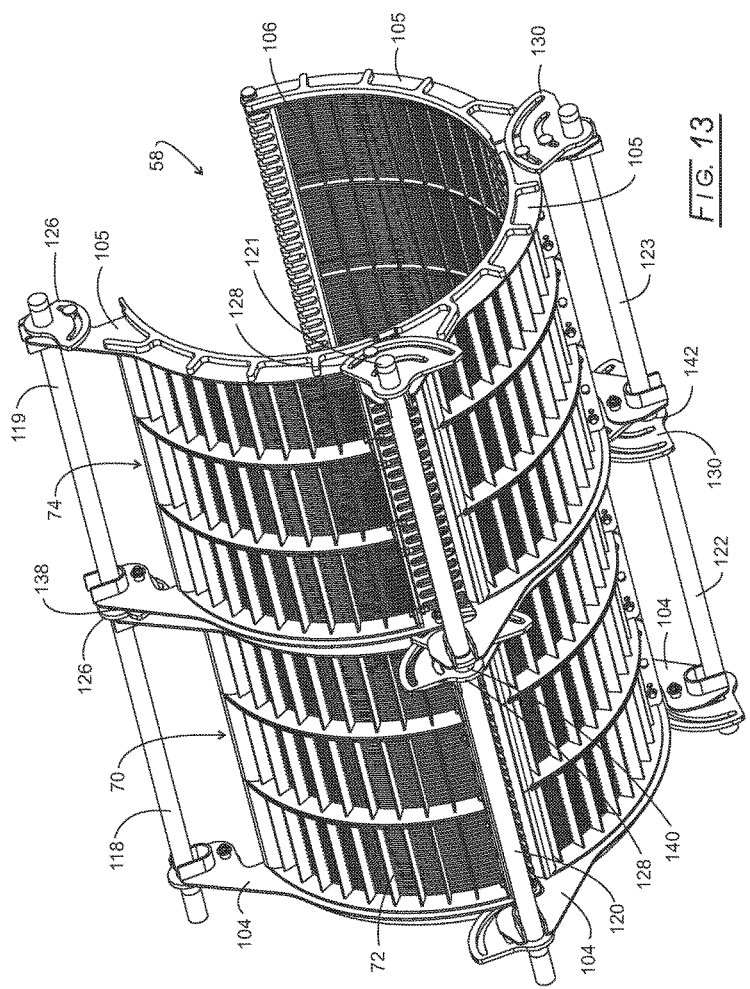

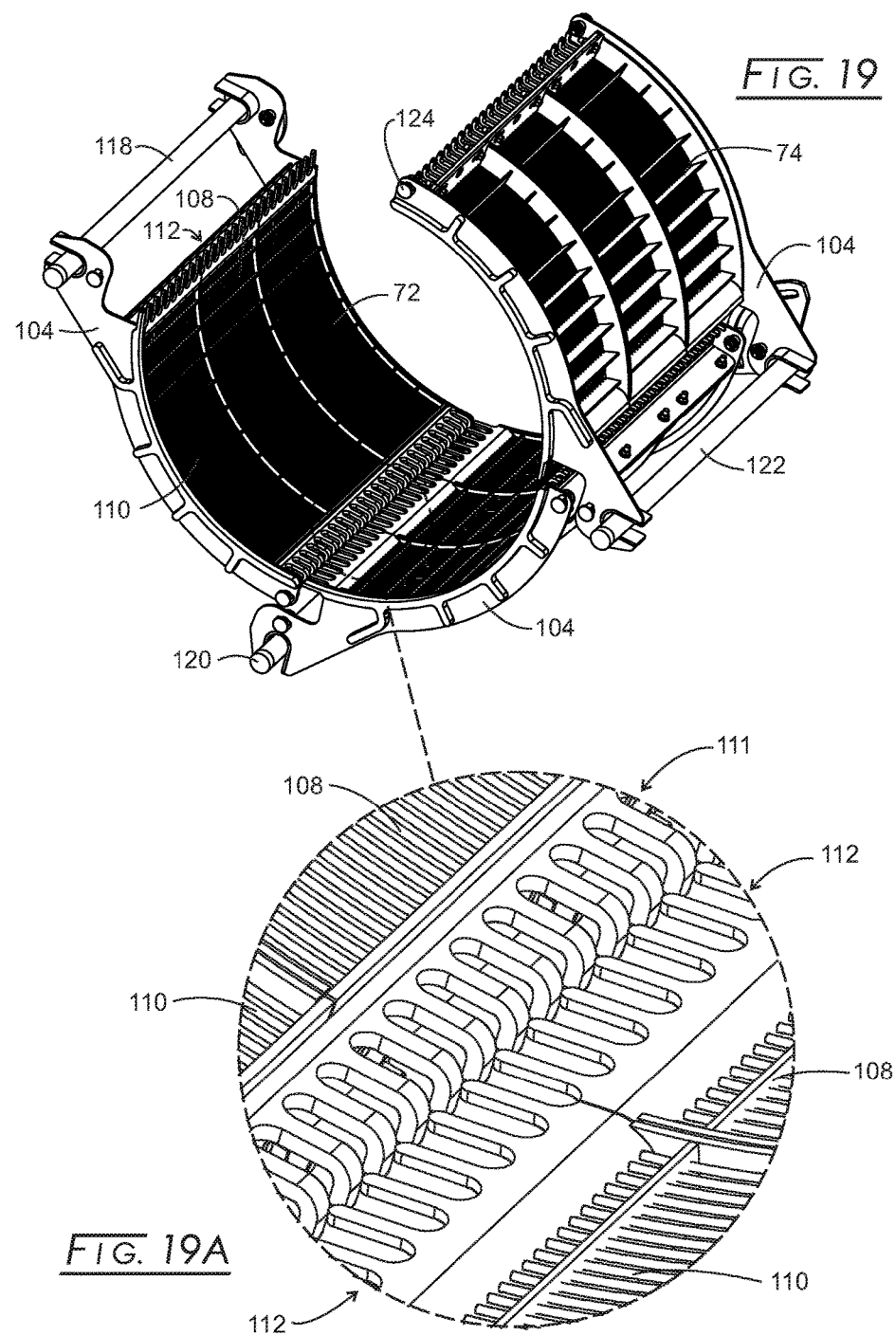

THREE-SECTION CONCAVE AND ADJUSTMENT MECHANISM FOR AN AGRICULTURAL HARVESTING COMBINE

CROSS-REFERENCE TO RELATED APPLICATIONS

None.

STATEMENT REGARDING FEDERALLY SPONSORED RESEARCH

Not applicable.

BACKGROUND

The present disclosure relates to harvesting articulated (jointed) combines and more particularly to improved concaves in the forward tractor or crop processing power unit (PPU).

Most agricultural combines use a rotary threshing and/or separating system including at least one rotor drivingly rotated about a rotational axis within a rotor housing, the housing having a lower region including a perforated concave spaced radially outwardly of the rotor. The rotor often may have a frusto-conical inlet end having a helical flight or flights therearound for conveying a flow of crop material into the space between the rotor and the housing. The main body of the rotor typically will have an array or layout of threshing elements, most commonly including rasp bars and separating elements, and/or elongated tines, all of which protrude radially outwardly therefrom into the space. The rasp bars and separator bars are configured differently, so as to perform different functions and may not all be present on a given rotor design. The functions of the rasp bars include to cooperate with one or more vanes and guides typically disposed around the upper portion of the inner circumference of the rotor housing, for conveying a mat of the crop material along a generally helical path through the space, while cooperating with the vane or vanes and/or guides, and other aspects of the concave, e.g., bars, perforations and the like of the concave, to break up larger components of the crop material into its constituents, namely larger constituents or elements of crop residue commonly referred to as straw, which includes stalks, stems, cobs and the like, and smaller constituents which comprise the grain and smaller elements of material other than grain (MOG), in the well known manner.

Rasp bars usually are relatively narrow and generally concentrated nearer the inlet end of the rotor and include a plurality of serrations defining grooves in the threshing element. These grooves are oriented at small acute angles to, or generally aligned with, the direction of rotation of the rotor for raking or combing through the mat of crop material and uncoupling the smaller constituents from the crop material thus allowing the grain to fall through the openings in the concave. Straight separator bars, in contrast, are often longer and generally located nearer to the discharge end of the rotor and include one or more bars with at least one sharp edge extending perpendicular to the direction of rotation to plow the larger components of the crop mat and carry them away from the smaller grain and MOG. The function of typical straight bars is to disrupt the consistent flow that shorter rasp bars establish and, thereby, cause grain to be shaken out of the straw due to that turbulence.

To minimize damage to the grain it is desirable to separate the grain from the mat of crop material so it can fall through the openings in the concave as far forward in the threshing system as possible. The number and size of openings in the forward portion of the concave is limited, however, and it has been observed that some of the threshed grain travels over additional rasp bars or other threshing surfaces on the rotor prior to falling through an opening of the concave.

It has also been observed that when the relatively narrow rasp bars engage the mat of crop material, some of the larger portions, particularly ears of corn, will deflect off rather than flowing over the rasp bars. As a result, the grain remains in the threshing system longer, encountering more threshing elements, risking damage to the grain, and increasing the likelihood that the cobs will break.

Accordingly, what is sought is a threshing system for an agricultural harvester including threshing elements, which overcome at least some of the problems, shortcomings, or disadvantages set forth above.

BRIEF SUMMARY

Disclosed is a rotor and cage assembly that includes a skeleton of curved spaced-apart side members affixed to laterally extending horizontal (upper and lower) spaced-apart members therebetween and surrounding the rotor. One of the curved spaced-apart side members is terminated with curved fingers. Three concave inserts insert laterally into the skeleton spanning 270° around the rotor. One of the concave inserts carries straight fingers that interlace between the skeleton side member curved fingers. A control assembly of plates having arcuate slots placed at 3 of the pivots of the skeleton assembly, control bars connected to the skeleton pivots, and an actuator connect to the control bars at one end effect arcuate rotation of the control bars resulting in the synchronized rotation of the arcuate slotted plates so that the interlaced straight fingers move closer together or farther apart with the fixed skeleton assembly curved fingers for different types of grain. The interlacing and overlapping concave inserts permit the three sections of 270° degree wrap to expand and contract their combined circumference as the concaves move nearer and farther from the rotor swung diameter. This movement is necessary in order to adjust to various crops and conditions, specifically and intentionally to prevent wide gap spaces between concave inserts especially when the assembly is in its open position. A reasonably identical grate assembly, which may or may not allow adjustment, follows and is adjacent to the concaves skeleton and also surrounds the rotor. Of course, the number off concave inserts could be greater or lesser in number and extend to less or more than 270°. For present purposes, the two different sets of fingers "interlace" both by being laterally offset (side-to-side), but also by being vertically offset (up-and-down). The key for interlaced fingers is that they move closer together and further apart for different types of grains.

A concaves control assembly for a concaves assembly includes a skeleton for receiving at least two concave inserts end-to-end. At least two concave inserts are housed within the skeleton for threshing grain in concert with a rotor assembly. Rotatable plates have arcuate slots are located where the at least two concave inserts meet and are carried by and are rotatable with skeleton pivot pins. Control bars connect to and are between the skeleton pivot pins. An actuator connects to the control bars at one end of one of the control bars, whereby actuation of the actuator moves the control bars causing arcuate rotation of the arcuate slotted plates for moving the at least two end-to-end concave inserts closer together and farther apart.

A grates control assembly for a grates assembly includes a skeleton for receiving at least two grate inserts end-to-end. At least two grate inserts insert within the skeleton for separating grain in concert with a rotor assembly. Rotatable plates have arcuate slots and are located where the at least two grate inserts meet and are carried by and rotatable with skeleton pivot pins. Control bars connect to and are located between the skeleton pivot pins. An actuator connects to the control bars at one end of one of the control bars, whereby actuation of the actuator moves the control bars causing arcuate rotation of the arcuate slotted plates for moving the at least two end-to-end grate inserts closer together and farther apart.

The concaves assembly and grates assembly are placed together with both the concaves control assembly and grates control assembly working in concert to adjust both the concaves assembly and the grates assembly. The actuator of some of the grates inserts may be manual and/or powered.

These are other features will be described in detail below.

BRIEF DESCRIPTION OF THE DRAWINGS

For a fuller understanding of the nature and advantages of the present method and process, reference should be had to the following detailed description taken in connection with the accompanying drawings, in which:

FIG. 11 is a front isometric view of the concaves of FIG. 8;

FIG. 12 is a side isometric view of the rotor assembly of the concaves;

FIG. 13 is a bottom isometric view of the concave grates and concaves frame assembly;

FIG. 19 is an isometric view of the concaves sieves assembly in an open position;

FIG. 19A is a blowup of the fingers of the concaves sieves assembly of FIG. 19 with the fingers in an open position consonant with the concaves being in an open position;

The drawings will be described in greater detail below.

DETAILED DESCRIPTION

Referring initially to FIGS. 1, 2, 3, and 4, an articulated harvester, 10, consists of a powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin, 28, (see also FIG. 14) carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned application Ser. No. 14/946,842 filed Nov. 20, 2015.

Figure 1:
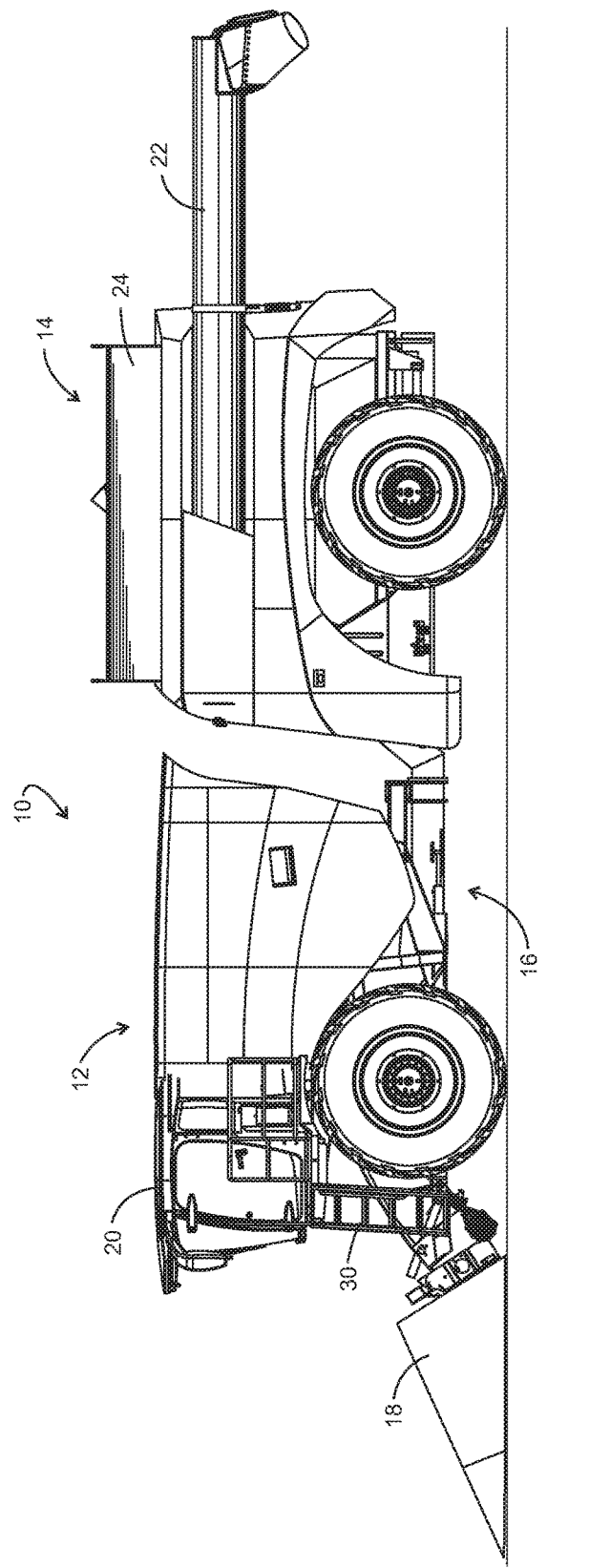
FIG. 1 is a side elevation view of an articulated combine having the disclosed grain cart.
Figure 2:
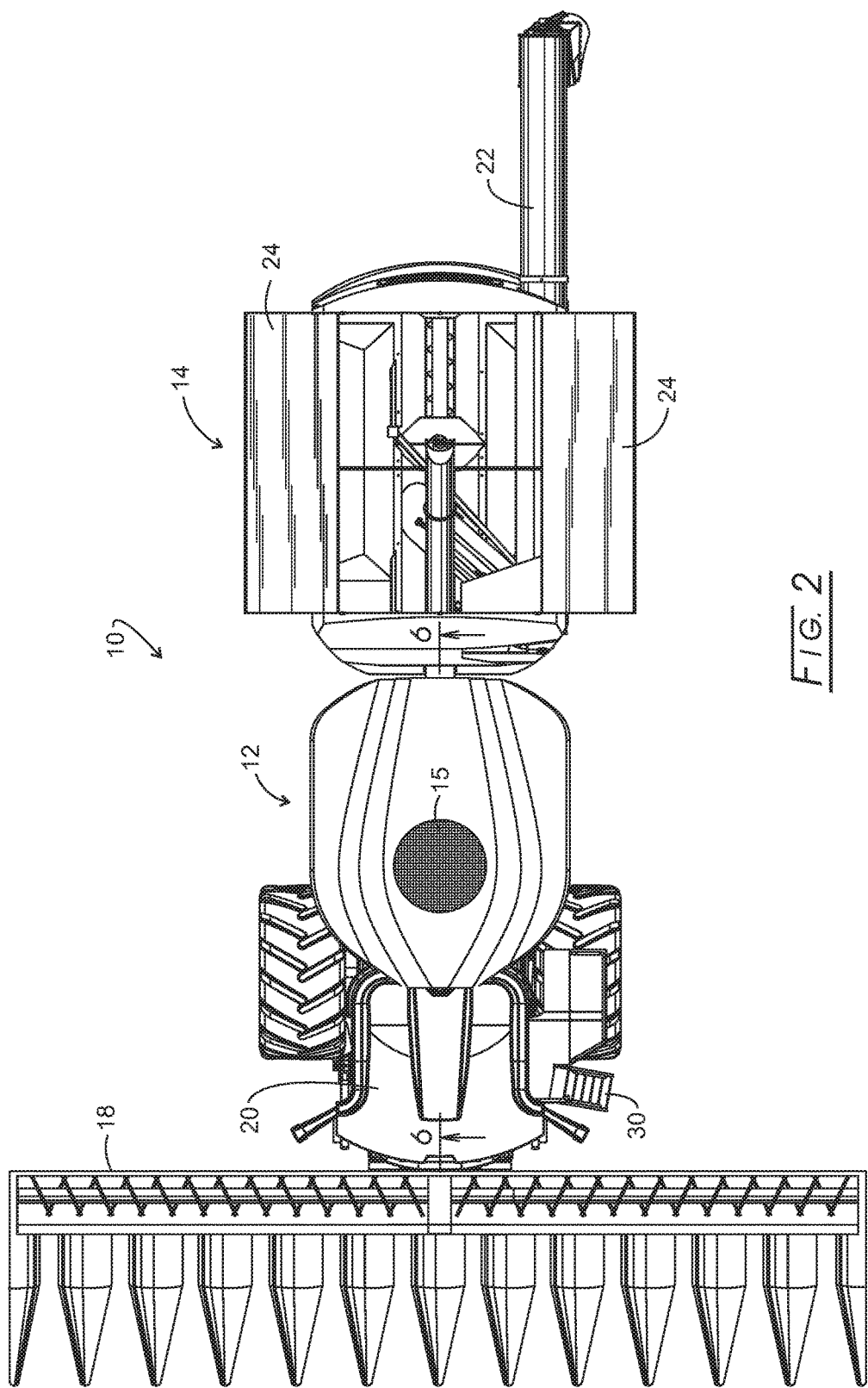
FIG. 2 is an overhead view of the articulated combine of FIG. 1.
Figure 3:
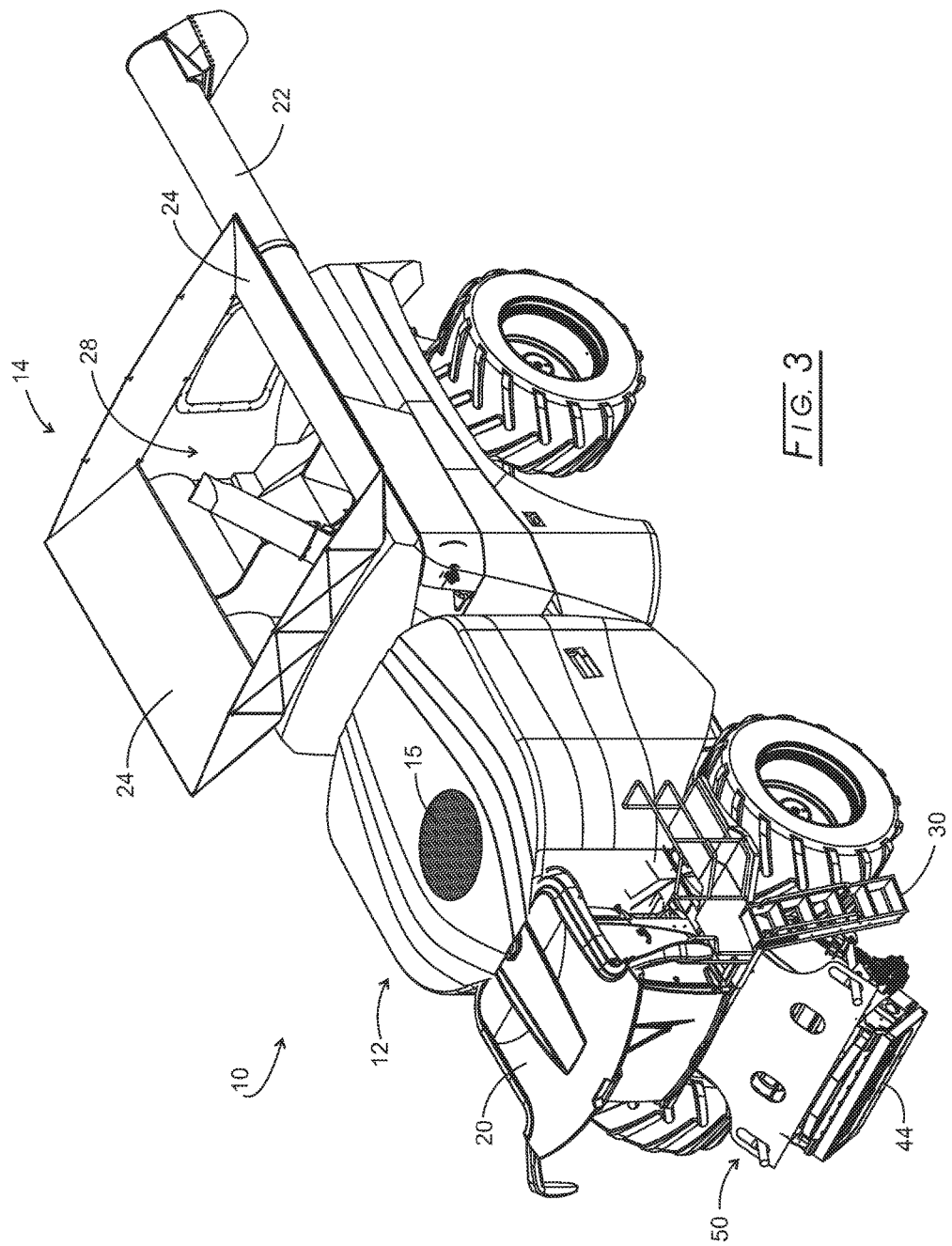
FIG. 3 is an isometric view of the articulated combine of FIG. 1.
Figure 4:
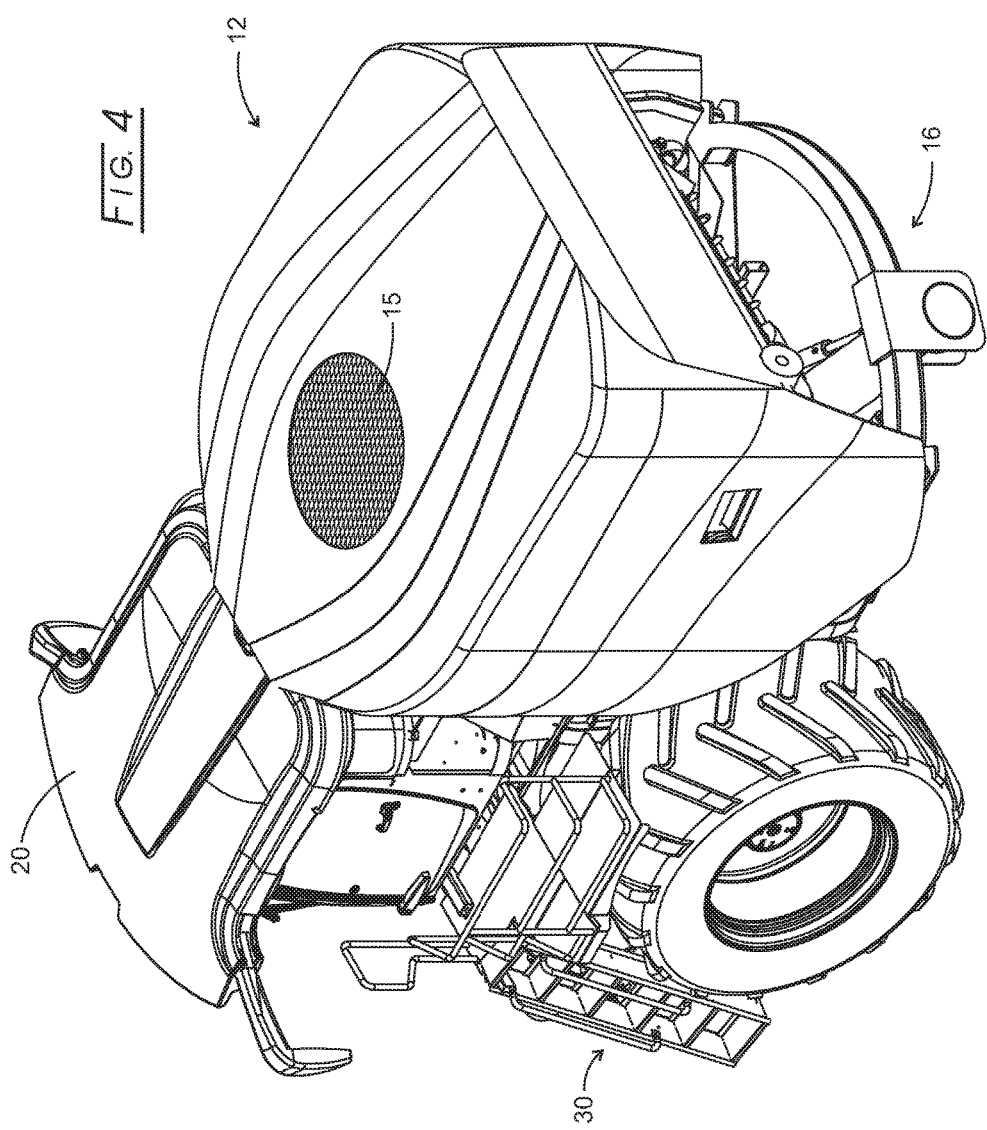
FIG. 4 is an isometric view of the PPU from its rear.
Figure 5:
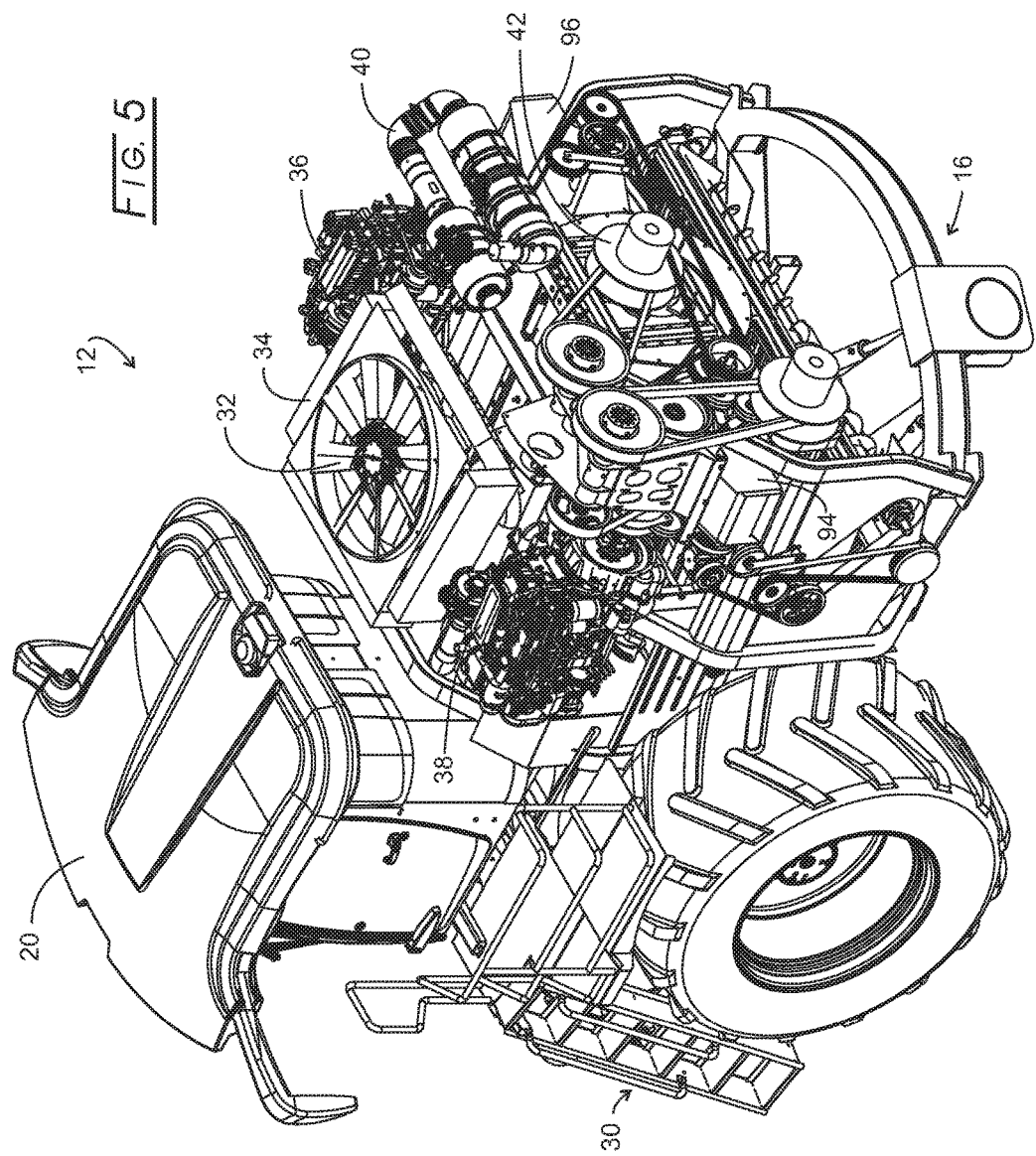
FIG. 5 is the isometric view of FIG. 4 with the outer shell or skin removed from the PPU.

Referring now to FIG. 4, the operator is granted access to cab 20 by a stair assembly, 30, that extends upwardly from just above the ground and will be more fully disclosed in commonly owned application Ser. No. 15/654,786, filed Jul. 20, 2017. The skin or shell has been removed in FIG. 5 to reveal the components housed within PPU 12. A fan assembly, 32, is located centrally for air to enter through screened air inlet 15. This location was chosen, as it arguably will be the cleanest flow of air around PPU 12. Radiators, as typified by a main cooling system air box, 34, surround fan assembly 32 and are coolingly connected with a pair of engines, 36 and 38, located on either side of main cooling fan assembly 32. Engine 36 powers the hydraulics for articulated combine 10, while engine 38 powers all other components of articulated combine 10. Exhaust after treatment assembly, 40, cleans air for emission control. When firing up the engines, which typically will be diesel engines, engine 38 is started first so that coolant flowing through engine 38 will warm up engine 36 and the hydraulic fluid for articulated combine 10. The twin engines aspect will be described in detail in commonly owned application Ser. No. 15/643,685, filed Jul. 7,2017 and the air inlet assembly will be described in detail in commonly owned application Ser. No. 15/642,799, filed Jul. 6, 2017. Other components visible in FIG. 5 will be described in detail below.

Figure 6:
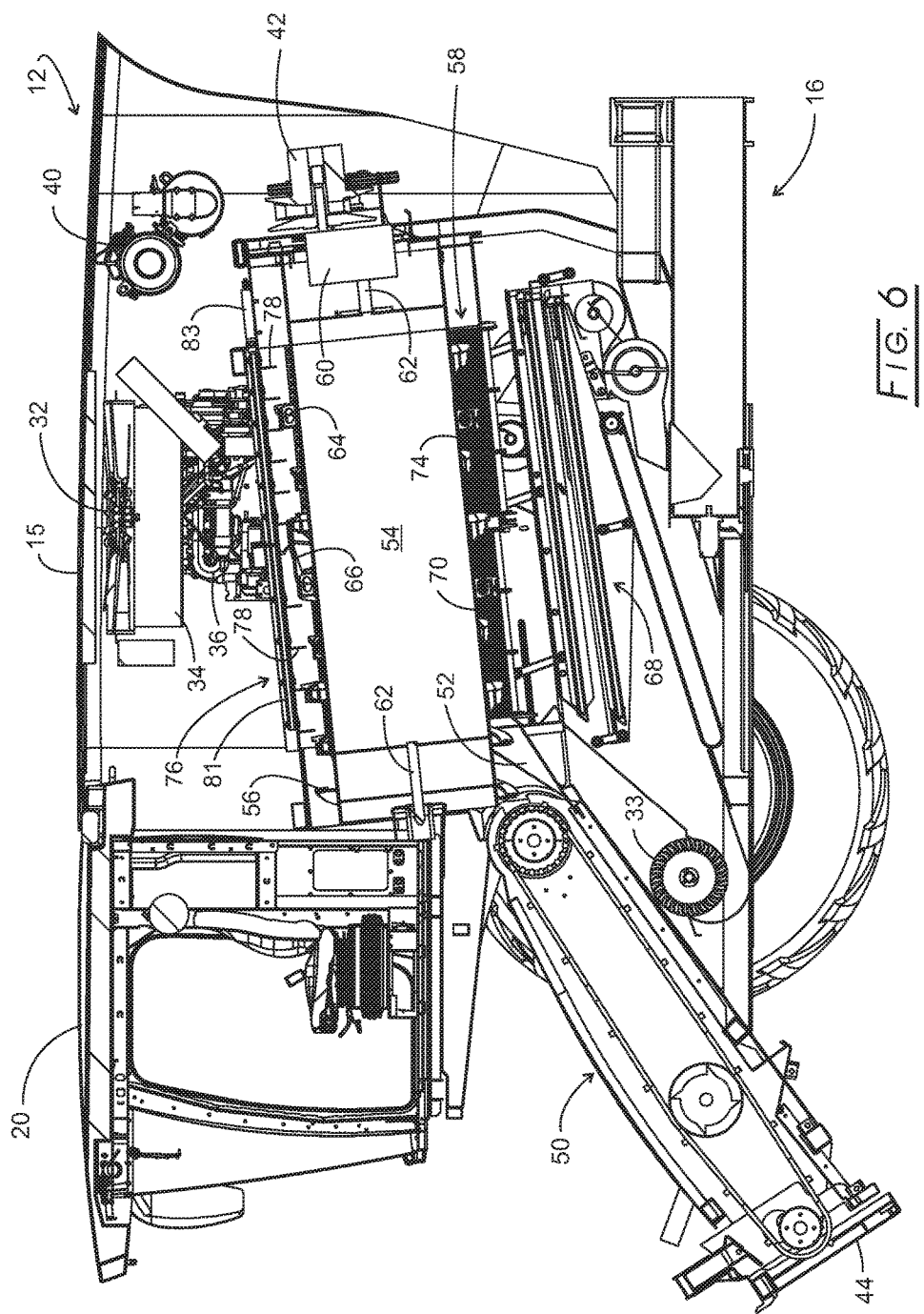
FIG. 6 is a sectional view taken along line 6-6 of FIG. 1.

Looking next at FIG. 6, grainhead 18 typically will be between about 30 and 50 feet wide and severs the crop in various fashions from its stalk or its attachment to earth. Grainhead 18 is carried by a feeder face adapter, 44, to a feeder mechanism assembly, 50, as described in detail in commonly-owned application Ser. No. 15/621,218, filed Jun. 13, 2017, which conveys the severed crop consisting of both stalk and grain. By convention in the industry, all material that is not grain is referred to as "Material Other than Grain" or, simply, "MOG".

Progressing rearwardly, the crop material reaches the end of feeder assembly 50 at velocity and is projected rearwardly and upwardly onto the walls of a transition cone, 52, which is a robust structure that describes shape and direction of material flow and generally funnels the flow of crop material toward both sides and the bottom of a rotor inlet cone, 52, of a spinning rotor, 54 (see FIG. 12). Rotor inlet flighting, 56, is identified as the front portion of rotor 54 that is predominately 2, 3, 4, or more large auger flights attached to the skin of rotor 54 and serve to both propel the crop material rearward into a rotor cage, 58, and begin the rotation of the crop material (as viewed from the rear of the module) around the periphery of rotor cage 58. The rotation of rotor 54 occurs by virtue of a pulley assembly, 42, a gearbox, 60, and shaft, 62. Rotor cage 58 is the empty space located within the rotor tube and is formed by concaves, grates, and a top cover with vanes that define the rotor tube or cylinder within which the rotor rotates and provides all stationary surfaces that the grain is threshed against and separated therethrough.

The process within rotor cage 58 delivers the crop material off the end of flights 56 and onto rasp bar assemblies for grain threshing and separation (see FIG. 12). These rasp bar assemblies may be rough cast iron configurations that impact, move, and pinch the crop material in order to dislodge the grain from the MOG parts of the plant, such that the grain can be removed from the flow. A typical rasp bar, 64, as are all rasp bars, is attached to rotor 54 by means of its bolting to barnacles, as typified by a barnacle, 66, which in turn is welded to rotor 54 in carefully identified locations to form the desired spiral patterns on the rotor as a whole. The rasp bars will be located in a spiral configuration around rotor 54 such that the crop material will be rolled, twisted, and rubbed against itself, the net affect of which will be to have significantly enhanced and substantially "gentler" threshing action, thereby nearly eliminating grain damage common to units that "smack the crop with steel" to achieve threshing. Each raps bar assembly, then is composed of a rasp bar and a barnacle.

Figure 18:
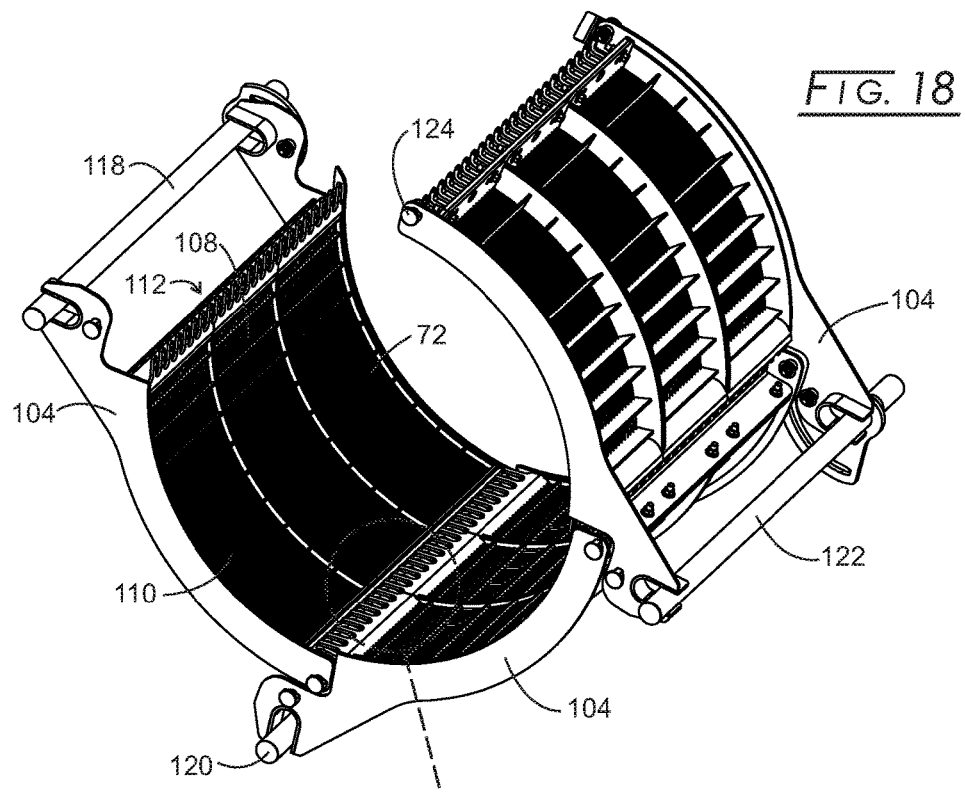
FIG. 18 is an isometric view of the concaves sieves assembly in a closed position.
Figure 18A:
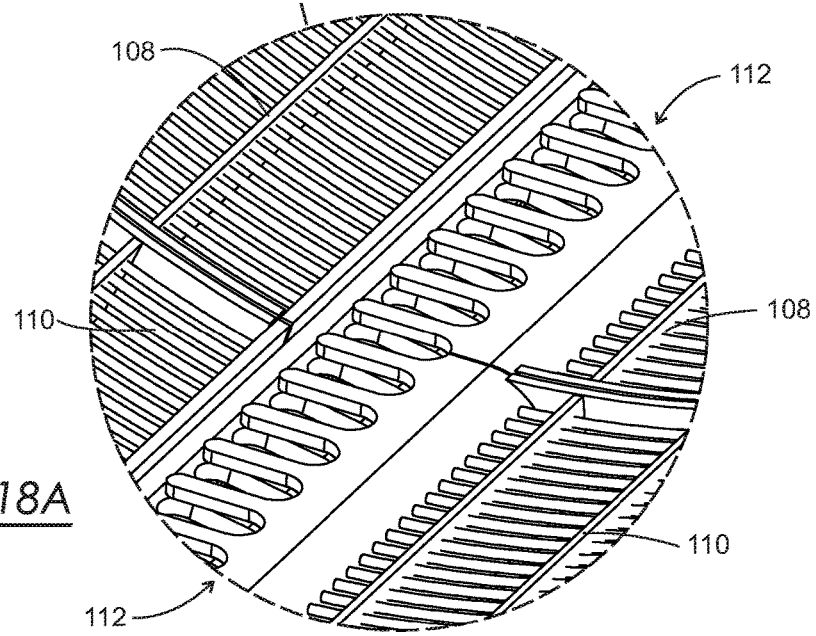
FIG. 18A is a blowup of the fingers of the concaves sieves assembly of FIG. 18 with the fingers in a closed position consonant with the concaves being in a closed position.

Entry into rotor cage 58 begins the threshing process, as the rasp bars rub the crop material across concaves, 70 (see also FIGS. 10 and 13), which are porous structures typically made of steel that surround the lower 270° of the periphery of rotor cage 58 and are divided into three sections, each of which covers 90°. Concaves 70 can have numerous actual structural constitutions, but in general provide a rough surface to cause significant rubbing and turbulence between the rasp bars and the top surface of concaves 70. Additionally, concaves 70 also are quite porous (have holes) to allow released grain to exit through the holes to be introduced to a cleaning area, 68. The concave inserts (often simply called "concaves"), as typified by a concave insert, 72 (see FIGS. 13 and 18), change from one type of surface to a different type of surface as crop type and condition dictate. Ideally and typically, this front section (~½) of the length of rotor cage 58 can remove nearly 75% of the entrained grain from the MOG material, and coincidentally pass on perhaps more than 80% of the MOG to a separation section or cleaning section 68 that follows and is described in greater detail in commonly owned application Ser. No. 15/642,799, filed Jul. 6, 2017. Typical to all harvesting combines, concaves 70 are suspended from above such that they can be moved in and out relative to the rasp bars swung diameter to cause a change in the relative clearance of the rasp bars top surface to the concaves inner surface. This allows for varying aggressiveness in the threshing process contrasted to crop type and condition and will be described in detail later herein.

The separation section of rotor cage 58 is located immediately behind (upstream) the threshing section and is for most part identical to the threshing section. By tradition, the same inserts that are located in the threshing area are now called grates, 74 (see FIG. 19), when in this rearward portion of the process. Typically, grates 74 are fixed in place and do not adjust in and out as do concaves 70; however, because the mechanisms are identical to the concave supports, grates 74 could be adjusted and that capability will be disclosed herein. The intended function of grates 74 is to separate the remaining grain from the MOG; however, since the MOG to grain ratio now significantly favors the MOG, the proportion of MOG exiting grates 74 is quite a bit higher that from concaves 70. All of this material falls downward toward cleaning system sieves 68.

Figure 7:
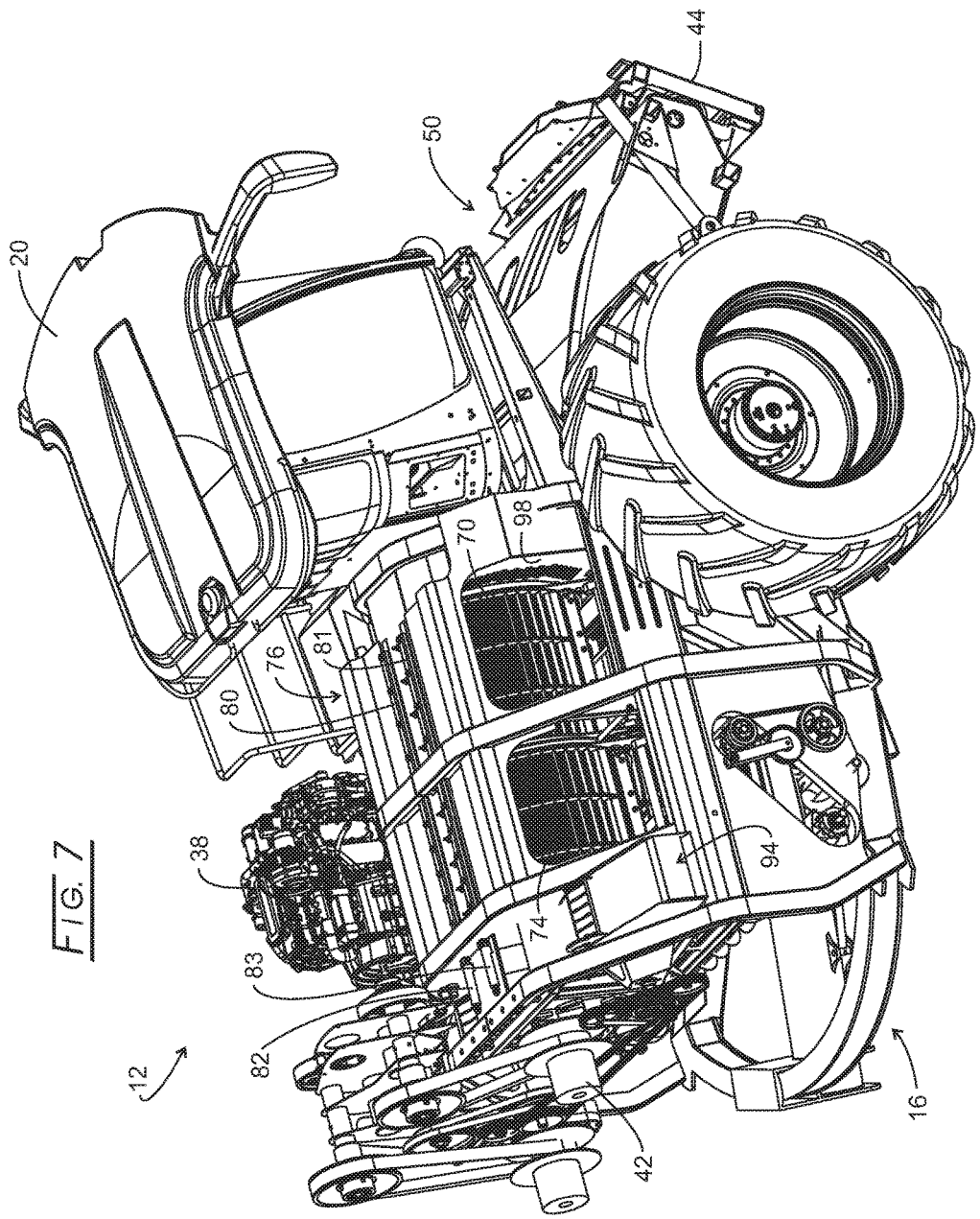
FIG. 7 is an isometric view like that of FIG. 5 of the opposite side of the PPU.

An important and new feature in rotor cage 58 is a top cover vane assembly, 76 (see FIG. 10), as typified by a vane, 78, located on the underside of the flat roof section of rotor cage 58. The vanes are basically steel angle plates that bolt thru the top cover on the one horizontal leg, and protrude downwardly into the crop flow with their 90° vertical leg. These vanes serve to regulate the speed of flow of material thru rotor cage 58, thereby affecting the relative aggressiveness of threshing and separation. When set at an angle more perpendicular to axial flow, the vanes retard the flow rate; when set at an angel less perpendicular ("laid back" or "sped up" in the language), the vanes allow faster, less power intensive flow. All other rotary combines have a curved top cover that requires the cage vanes to be curved also. This curvature sincerely limits the range of adjustment due entirely to the fact that as (for instance) a vane that would conform to a line that is perpendicular to axial on the cage cylinder, would be curved too much to fit a position that was 30° off of perpendicular. With the flat surface disclosed herein will have on the top cover. The vanes of top cover vane assembly (see FIG. 7) are attached to tubular control bars, 80 and 81, which is moved by cylinders, 82 and 83, to control their angle. Control can be exercised remotely in cab 20 by the operator to give the operator a tool that will be effective in controlling throughput versus threshing versus separation to optimize productivity of harvester 10. Top cover vane assembly 76 is described in great detail in commonly owned application Ser. No. 15/623,619, filed Jun. 15, 2017.

Finally the MOG (which by convention now changes its name to straw or residue) now located at the rear of the separation area (grates 74) is ready to be discharged from rotor cage 58 to be spread across the ground. In PPU 12, this will be done quite unconventionally by discharge openings in rotor cage 58 to discharge assemblies that contain straw chopper assemblies, 90 and 92 (see FIG. 9), where rapidly rotating drums with numerous swinging blades will reduce the length of the residue pieces and propel them horizontally and transversely outwardly at high velocity. Assisting in the chopping process are stationary knives, ("counter knives", "fixed knives"), not seen in the drawings, which act as shearing surfaces to hold the long residue for the swinging (sharp) knives to better cut the residue.

Figure 8:
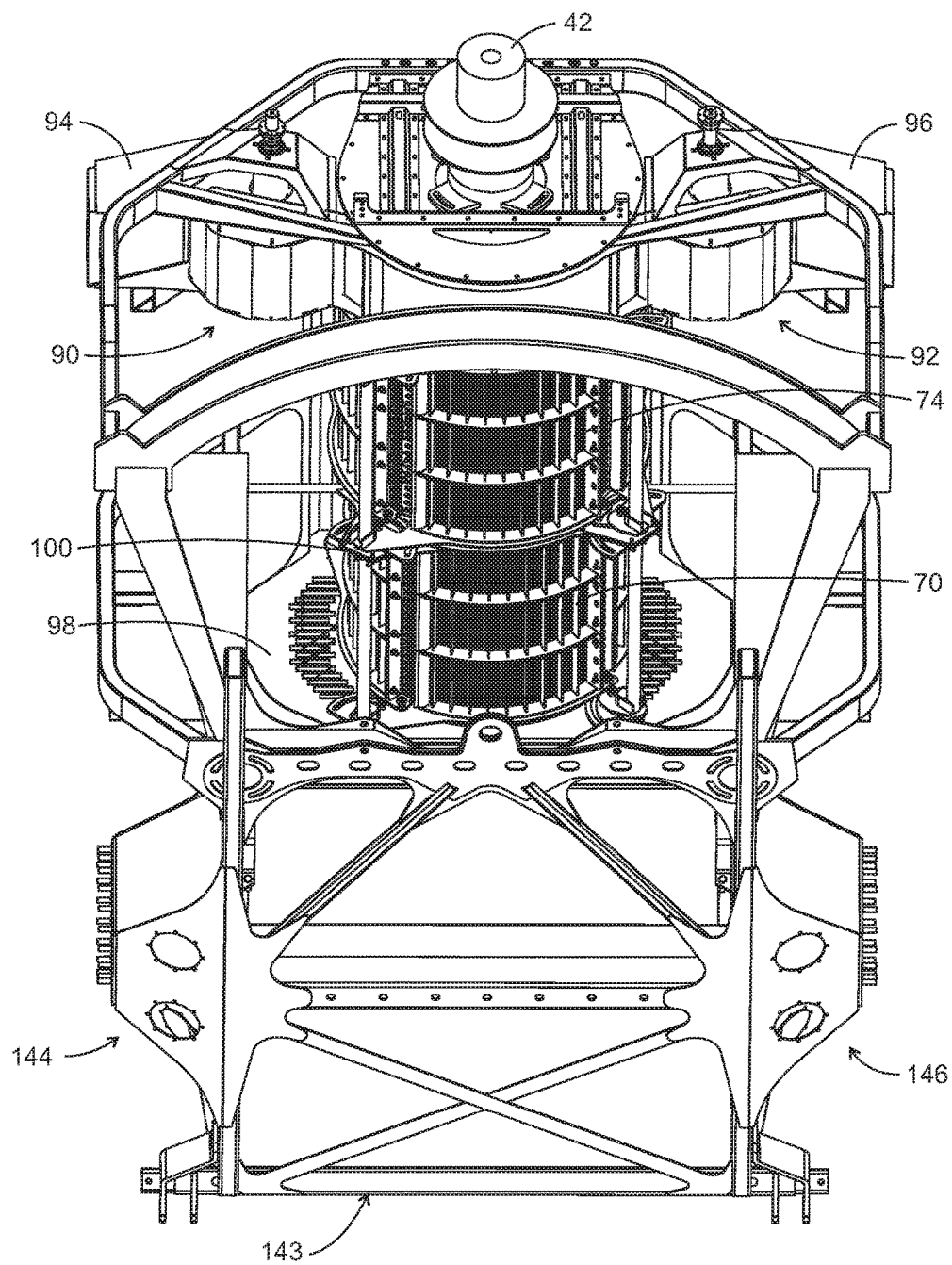
FIG. 8 is a bottom view of the PPU.
Figure 9:
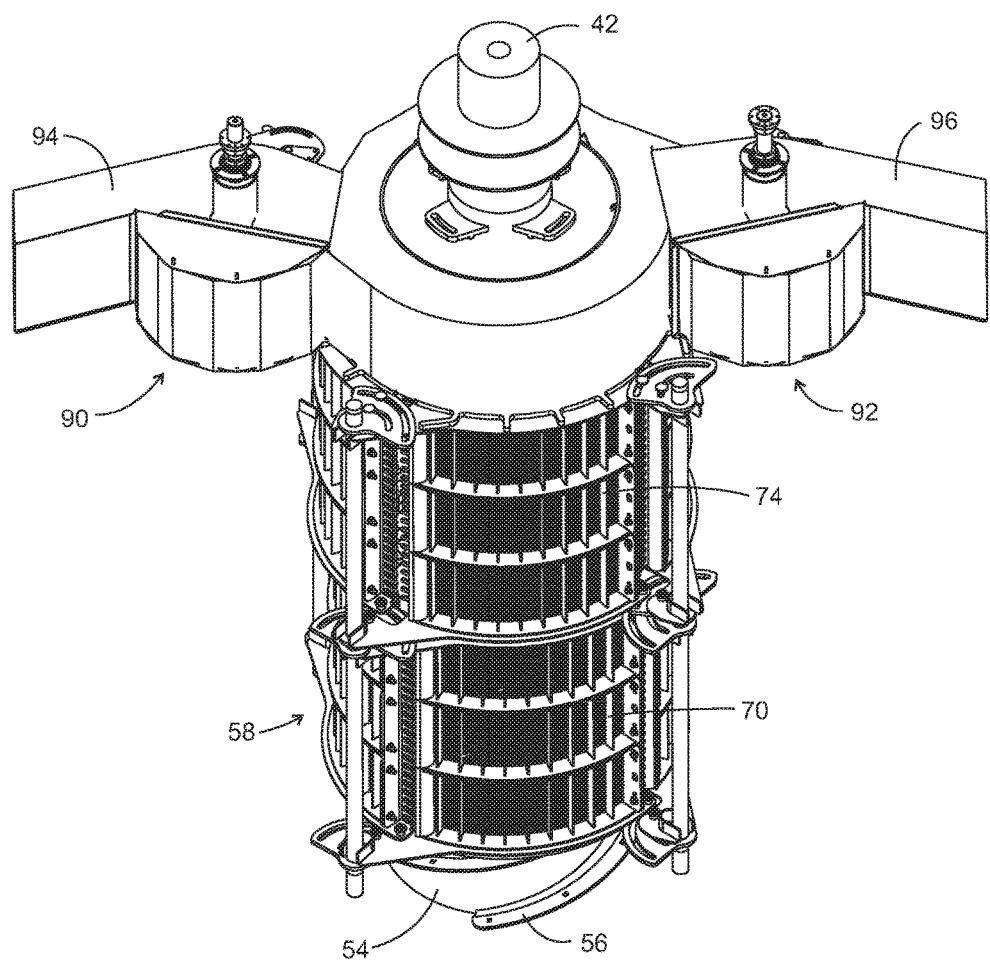
FIG. 9 is a bottom view of the concaves section of the PPU and includes the twin straw choppers.

Shortly after chopping and propulsion, the residue pieces will encounter straw hood assemblies, 94 and 96 (see FIG. 9), that is used as a deflector to influence the direction of the pieces such that some continue far out away from the vehicle, while variably others fall at distances from the vehicle, causing and ideally uniform distribution of the pieces over the ground surface. PPU 12 will have two sets of these chopper assemblies and knives 90 and 92, one on each side as seen in FIGS. 8 and 9 and described in detail in commonly assigned application Ser. No. 15/652,806, filed Jul. 18, 2017.

Returning to the MOG and grain that is being expelled through concaves 70 and grates 74, these materials exit the inserts at reasonably high velocity and on a trajectory imposed by both their angular velocity from spinning in rotor cage 58 and from the centrifugal force imparted by rotation of rotor 54, the net of which is largely an outward (if not radial) departure from rotor cage 58 down into the void below rotor cage 58 and above cleaning system assembly 68 (see FIG. 6) known as the "chaffer" (its purpose in the process is to help remove the bigger, lighter chaff from the grain by allowing the grain to fall through while rejecting the chaff to be blown out the rear of the machine). However, in accordance with the present disclosure, an additional cleaning component that takes advantage of that exit velocity of the material mix leaving the separation system is provided. Front Bulkhead 98 of the rotor/cage support structure has louvered slots (see FIG. 8) in it that will allow high velocity air being forced downwardly into a plenum to which the bulkhead is one wall, the driving force of the air being cleaning charge fan assembly (see FIG. 6) located above the rotor cage, in front of main cooling system air box 34 (see FIG. 6). The charge fan assembly will be collecting exhaust air from a cooler assembly 34, imparting new velocity to it and sending it down through the plenum formed by front cage bulkhead 98, rotor inlet cone 52, a separator sidesheet, and a cover sheet to complete the plenum. The purpose being to deliver air from above PPU 12 down through the plenum and into the inlet of cleaning fan 33, located in front of the axle, as explained in detail in U.S. Ser. No. 15/641,799(cited above).

As a matter of secondary assurance of high capacity, and because the disclosed PPU 12 configuration allows it, a bonus sieves assembly, as disclosed in commonly assigned application Ser. No. 15/649,684, filed Jul. 14, 2017, is provided. Unknown to the rest of the industry, these bonus sieves are allowed by the rear axle for harvesting combine 10 being on rear module 12, not beside the sieves. So the frame of PPU 12 will bulge outwardly wider once past the front tires, and fill that space on each side of the main sieves with narrower, shorter sieve members, bonus sieves, that in total will add about 20% more sieve area. Moreover, remembering the condition of having a much higher MOG ratio being expelled from the rear of the separation area, this bonus sieves area will add additional cleaning area back where the cleaning is made more difficult by higher MOG concentrations, whether that be in the airstream or on the sieve surfaces.

Under the front majority of the major sieves' length, a clean grain conveyor, a belt conveyor (running rearward on the top) that catches the grain as it falls, and conveys it rearward to a clean grain cross auger. A secondary, but equally important, function of the flat top of the conveyor is to serve as a converging plenum versus the lower sieve, such that the air being moved rearward by the cleaning fan is progressively force to be directed upward through the sieves, thus powering the pneumatic cleaning function of the cleaning system. If stray MOG were to fall through both sieves, this is yet another chance for that MOG piece to be blown rearward, and perhaps out of the system. Again, this is disclosed in detail in U.S. Ser. No. 15/641,799cited above.

The fate of the separated clean grain exiting the various cleaning systems in PPU 12 and its transfer to grain cart 12 is disclosed in commonly owned application Ser. No. 14/946,827 cited above.

Finally, PPU 12 will contain a tailings return system, as disclosed in detail in commonly owned application Ser. No. 15/649,684, filed Jul. 14, 2017, that will be located below and aft of the aft of cleaning assembly 68. Material that is small enough and dense enough to fall through the extreme rear section of the chaffer, referred to as a chaffer extension, and material that because of size or low density could not fall through the lower sieve will be delivered to a tailing auger trough. In the trough is a tailings cross auger, an auger with opposing flighting, that this time augers the material outward from the middle. As the material reaches the sidesheets of the major structure, it enters a tailings elevator, one on each side of the structure. Running on a sprocket on the (each) end of the cross auger will be a roller chain with rearward leaning paddles that are also canted to move the material inward against the inner wall as it is conveyed upward. The leaning and canting of the paddle reduces the conveying efficiency while also increasing the tumbling and rubbing of the unthreshed grain against the walls and outer ring of the elevator chute. This "rethreshed" material will then be introduced back into cleaning system 68 above the bonus sieves by auger flights on a tailings top drive shaft to make another attempt at proper cleaning and saving, or to be rejected again, and, in either case, it will in one way or another be ejected from the system.

Figure 10:
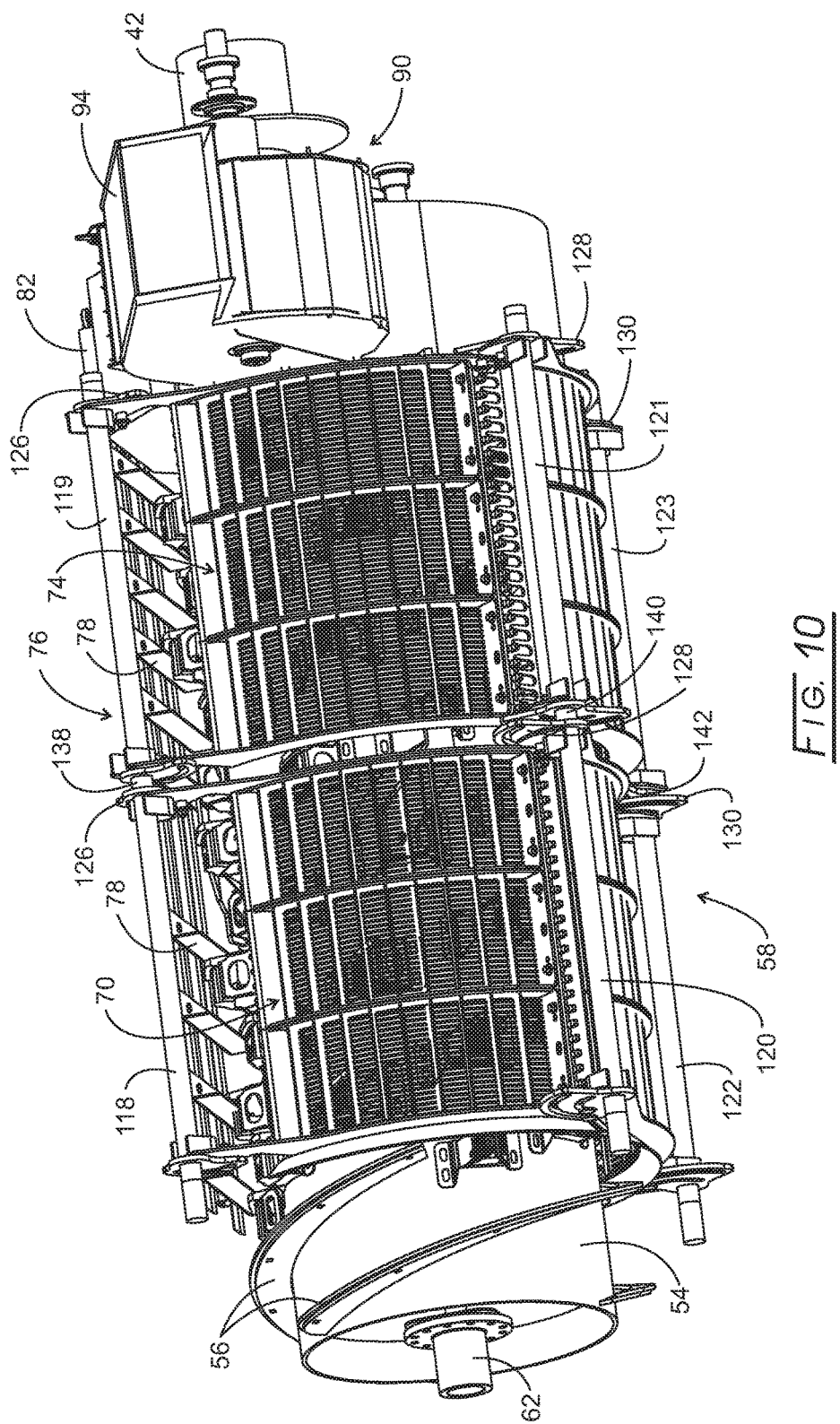
FIG. 10 is a side isometric view of the concaves of FIG. 9.
Figure 20:
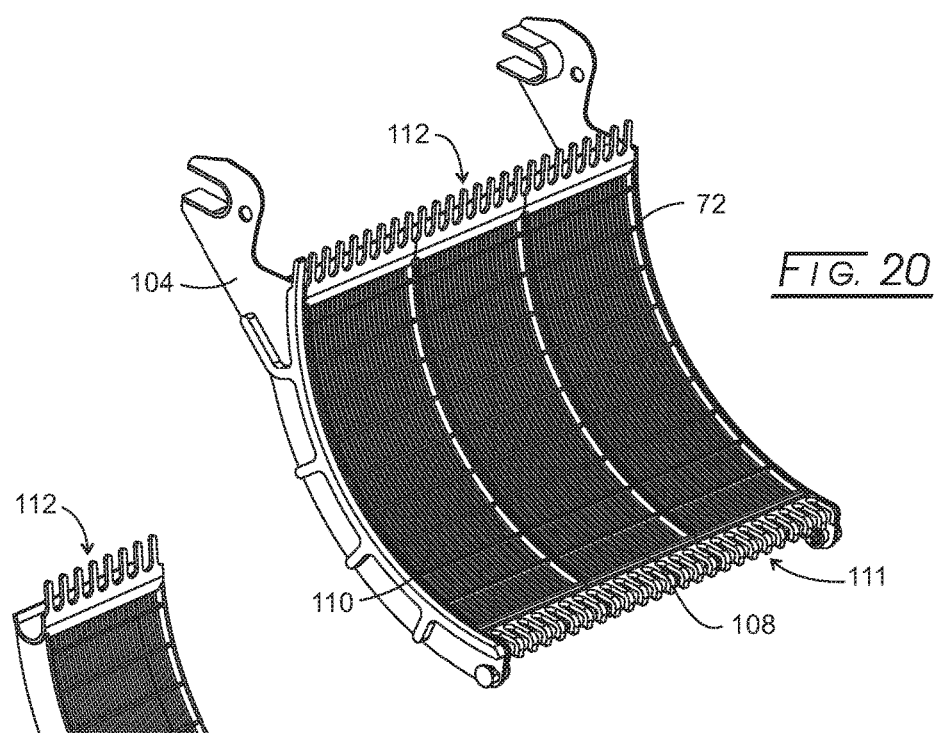
FIG. 20 is an isometric view of one of the 3 concaves sieves.
Figure 21:
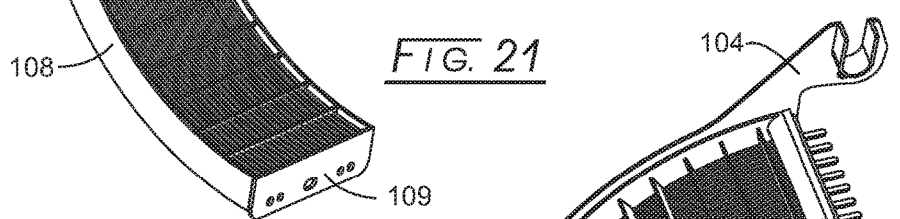
FIG. 21 is an isometric view of just one of the sieve inserts.
Figure 22:
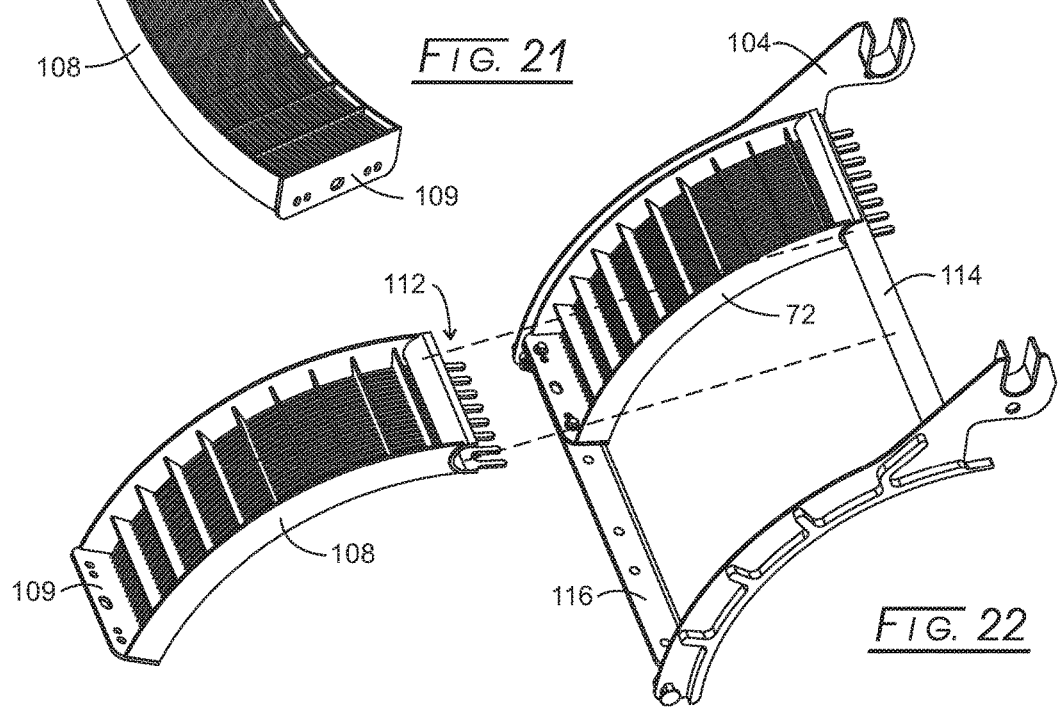
FIG. 22 is an isometric view showing installation of one of the sieve inserts.

At this point in the disclosure, we look at FIGS. 8 and 10 whereat the support for concaves 70 and grates 74 is shown. In particular, a front bulkhead, 98, a middle bulkhead, 100, and a rear bulkhead, 102, provide support for the rotor/cage structure. Looking at FIGS. 13-22, concaves 70 and grates 74 are disclosed in detail. A skeleton, 104, supports and accepts concave inserts, such as concave insert 72, and a skeleton, 105, that supports and accepts a grate insert, 106. There are three sieve inserts across and three sets of these inserts spanning 270°. FIG. 20 shows frame assembly 104, concave insert 72, a concave insert, 108, and concave insert 110. One end of concave insert 108 is flat plate, 109, for permanent attachment to skeleton 104, while the other end has a finger assembly, 112. The finger assembly end of concave insert 108 is curved and partially goes around an upper bar, 114, portion of skeleton 104 by virtue of its end having a U-shape to receive upper bar 114. The insertion of concave insert 108 into skeleton 104 is seen in FIG. 22 to involve concave insert 108 being moved from the side into position with flat 109 being bolted or otherwise attached to a flat bar, 116, of skeleton 104 and the U-shaped upper end taking in bar 114. All of the concave inserts are attached in a same manner. In fact, the grate inserts are similarly configured and inserted into frame skeleton 105 in the same manner. The disclosed design permits easy installation and removal of any one of the concave or grate inserts. A bent finger assembly, 111 (see FIG. 19A), is part of the skeleton assembly and is present for both the concave assembly and the grate assembly and interact with the finger ends of the concave and grate inserts to accommodate the size of the grain being handled.

Figure 14:
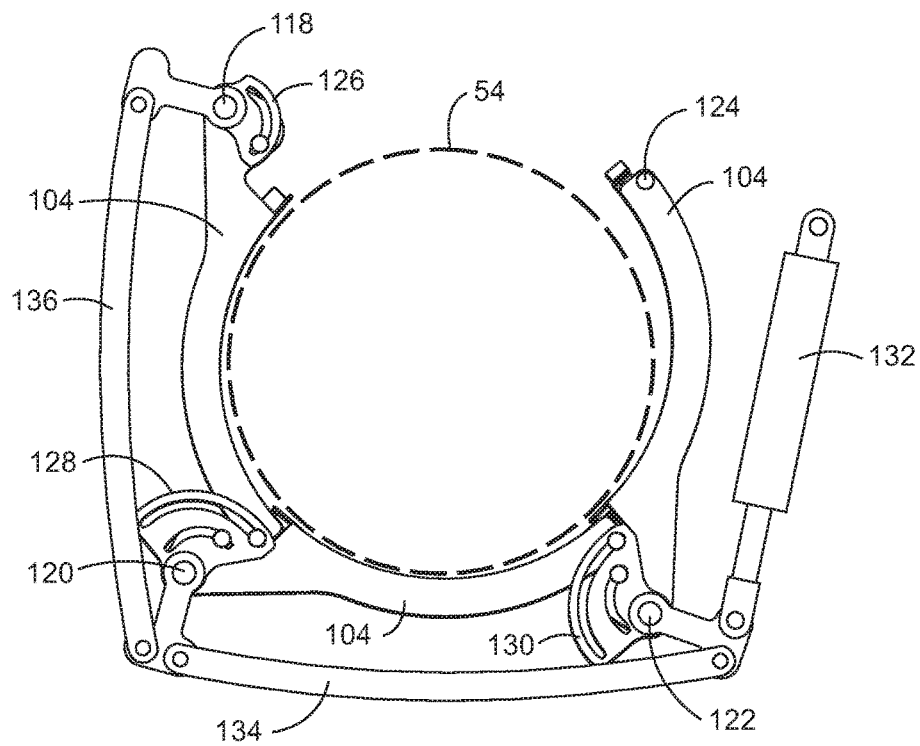
FIG. 14 is a front view of the concaves cage in a closed position with common actuator assembly.
Figure 15:
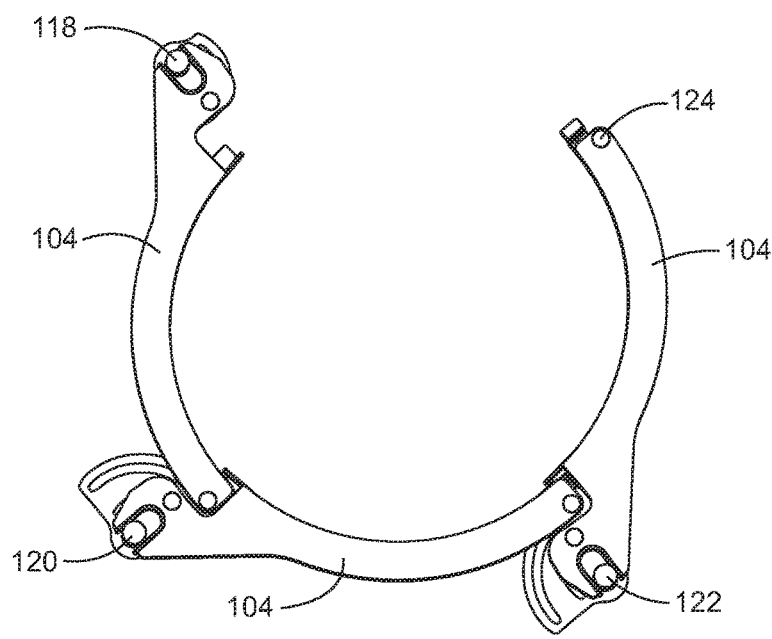
FIG. 15 is a front view of the concaves cage from FIG. 14 with the common actuator removed.
Figure 16:
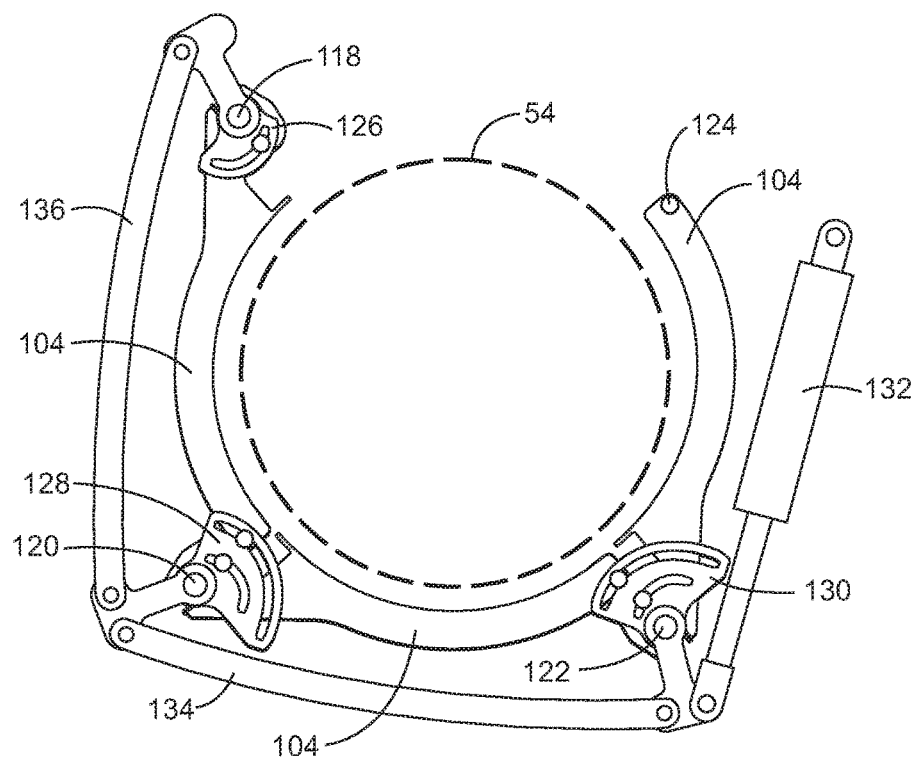
FIG. 16 is a front view of the grates (or bonus sieves) cage in an open position with common actuator mechanism.
Figure 17:
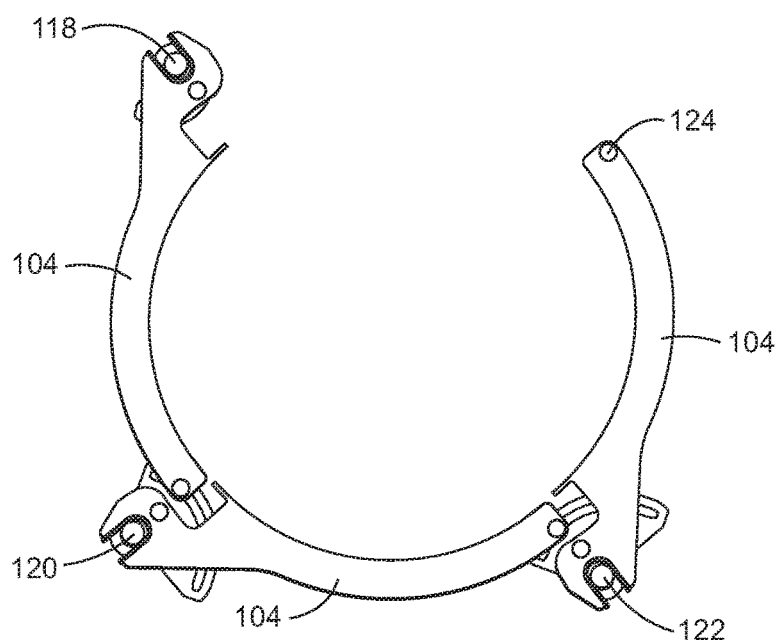
FIG. 17 is a front view of the grates (or bonus sieves) cage from FIG. 16 with the common actuator removed.

Referring additionally to FIGS. 14 and 15, the ends of skeleton 104 are configured to receive rotatable bars, 118, 120, and 122, and a fixed bar, 124. As seen more clearly in FIGS. 14 and 15, slotted plates, 126, 128, and 130, having arcuate slots are attached to rotatable bars 118, 120, and 122 and are rotated by a cylinder assembly, 132, so that the finger assemblies are in a closed position. In this closed position, the sieve inserts are in a pinched configuration with respect to rotor 54 for small grain. As more clearly seen in FIGS. 16 and 17, cylinder assembly 132 has rotated so that the finger assemblies are in an open position for large grain. Simultaneous motion is achieved by cylinder assembly being attached to link bars, 134 and 136. A similar set of link bars are provided at the other end of the concaves assembly. The arcuate rotation results in the fingers being moved in an arcuate motion and in an up and down motion. These simultaneous motions result in the fingers, straight on one side and curved on the other side, moving closer and further apart while simultaneously moving slightly up and down. Additionally, cylinder assembly 132 can be actuated remotely by the operator. Additionally, while hydraulic cylinders are shown in the drawings, such cylinders (or actuators in general) could be pneumatic, linear actuators, electric motors, or other assemblies. Actuators are "powered" for present purposes.

While the disclosed concaves inserts surmount 270°, a lesser or greater amount of wrap could be designed into such concave inserts. Moreover, the sections of concaves can be adjusted independently to not only effect a change in clearance to the rotor, but also to achieve multiple pinch points around the periphery in the same number as the number of peripheral sections. The drawings show 3 such concave sections resulting in triple convergence of concave clearance to the rotor. The net effect of this triple convergence is to enable a single crop pass around the periphery of rotation to have threshing and separation equivalence to three separate passes from typical configurations, greatly increasing the efficiency of threshing and separation. The disclosed design, then, permits the totality of the designated "separation" area, the grates, to be reconfigurable with respect to the type of grate separation surface chosen, as opposed to being fixed sized holes. Moreover, the grates also could be designed for simple adjustment for clearance and pinch should that be desired.

The flexibility of the concave adjustment mechanism permits their synched or adjusted independently. The same goes for the grates with the proviso that the grates could be synched with the concaves. The concave inserts and grate inserts are easily and quickly inserted and withdrawn according to their disclosed design. All concave inserts and all grate inserts are the same in design, permitting any insert to be installed in any location. Finally, the concave inserts have sets of fingered panels that move closer and apart as the concave clearance is adjusted inwardly and outwardly. These fingers on the panels are offset to each other to effect great change in the open area and shape of the open area to give prescribed separation based on crop type.

Returning to FIG. 13, it will be observed that spacers, 138, 140, 142, and another not seen, provide a break between bar 118 for concaves 70 and a bar, 119, for grates 74. The same is true for bar 122 and a bar, 123. Such spacers could be omitted and the respective bars be continuous for grates 74 to rotate as do concaves 70. Alternatively, grates 74 could be constructed, as are concaves 70 for independent rotation and adjustment.

Figure 23:
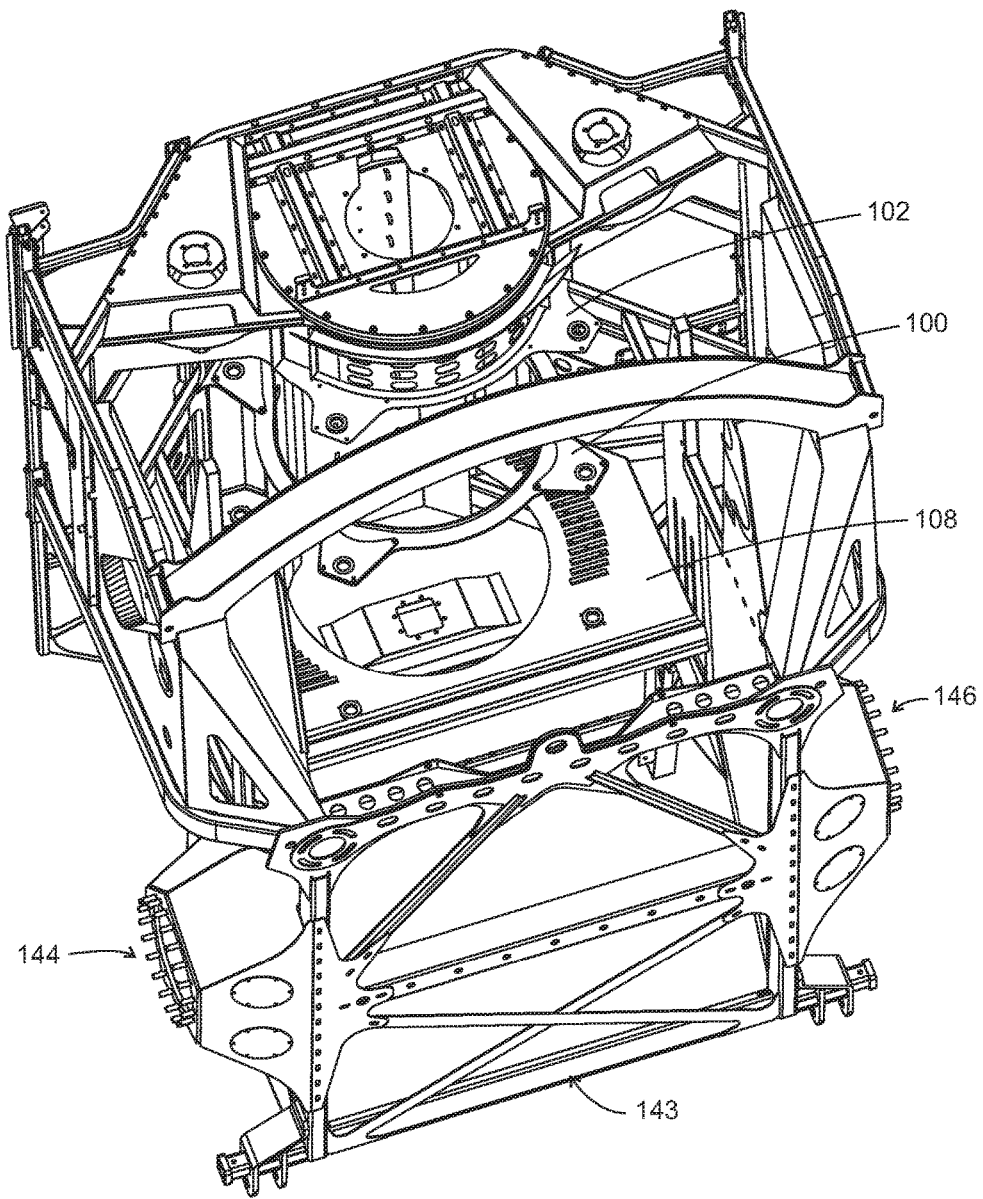
FIG. 23 is an isometric view of the frame assembly from underneath.

FIG. 23 shows frame assembly 143 with its various members. Of note is the bulging of the frame behind where the tires, locations 144 and 146 are located to accommodate additional treating assemblies for separation of the grain, as described above and in related patent applications. Front slotted bulkhead 98 is seen in this view also. Some of the plates will contain holes or apertures for achieving weight reduction without sacrifice of structural strength.

While the device and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. A rotor and cage assembly for a harvesting combine, which comprises:
   (a) a rotor having a longitudinal axis of rotation;
   (b) a cage assembly comprising a concaves skeleton comprising curved spaced-apart side members affixed to laterally extending horizontal spaced-apart members therebetween with pivots where they connect, the skeleton surrounding the rotor, one of the curved spaced-apart side members being terminated with curved fingers;
   (c) 3 concave inserts insertable laterally into the skeleton spanning 270° around the rotor, one of the concave inserts carrying straight fingers that interlace with the skeleton horizontal member curved fingers;
   (d) a control assembly comprising:
      (i) plates having arcuate slots placed at 3 of the pivots of the skeleton assembly;
      (ii) control bars connected to the skeleton pivots; and
      (iii) an actuator connected to the control bars at one end for arcuate rotation of the control bars resulting in synchronized rotation of the arcuate slotted plates so that the interlaced straight fingers move closer together or farther apart with the curved spaced-apart side members curved fingers for different types of grain; and
   (e) a grate assembly following and adjacent to the concaves skeleton and surrounding the rotor.

2. The rotor and cage assembly of claim 1, wherein the rotor has flights at an end for receiving grain for threshing.

3. The rotor and cage assembly of claim 1, which additionally comprises 3 adjacent sets of the concave inserts.

4. The rotor and cage assembly of claim 1, wherein the grate assembly comprises 3 grate inserts insertable laterally into a grate skeleton assembly spanning 270° around the rotor.

5. The rotor and cage assembly of claim 4, wherein the grate inserts are pivotally inserted into the grate skeleton.

6. The rotor and cage assembly of claim 4, additionally comprising a front bulkhead, a middle bulkhead, and a rear bulkhead that provide support for the concaves assembly and the grates assembly.

7. The rotor and cage assembly of claim 1, wherein the rotor contains a spiral pattern of rasp bar assemblies.

8. The rotor and cage assembly of claim 1, wherein arcuate slotted plates with rotating rods also adjust the concave inserts for different types of grain.

9. The rotor and cage assembly of claim 1, wherein the interlaced straight fingers move closer together or farther apart with the curved spaced-apart side members curved fingers one or more of laterally or vertically.

10. The rotor and cage assembly of claim 1, wherein the rotor has the same diameter along its longitudinal axis of rotation.

11. A concaves control assembly for a concaves assembly comprising:
   (a) a skeleton for receiving at least two concave inserts end-to-end;
   (b) at least two concave inserts inserted within the skeleton for threshing grain in concert with a rotor assembly;
   (c) rotatable plates having arcuate slots, located where the at least two concave inserts meet, and carried by and rotatable with skeleton pivot pins;
   (d) control bars connected to and between the skeleton pivot pins; and
   (e) an actuator connected to the control bars at one end of one of the control bars,
   whereby actuation of the actuator moves the control bars causing arcuate rotation of the arcuate slotted plates for moving the at least two end-to-end concave inserts closer together and farther apart.

12. The concaves control assembly of claim 11, wherein one of the concave inserts carries curved fingers at the one end and the second concave inserts carries straight fingers interlaced between the curved fingers wherein actuation of the actuator moves the interlaced fingers closer together or farther apart for different sized grain.

13. The concaves control assembly of claim 11, wherein the skeleton carries 3 concave inserts in end-to-end abutting relationship about 270°.

14. The concaves control assembly of claim 13, wherein the skeleton carries three sets of the 3 end-to-end concave inserts.

15. A grates control assembly for a grates assembly comprising:
   (a) a skeleton for receiving at least two grate inserts end-to-end;
   (b) at least two grate inserts inserted within the skeleton for separating grain in concert with a rotor assembly;
   (c) rotatable plates having arcuate slots, located where the at least two grate inserts meet, and carried by and rotatable with skeleton pivot pins;
   (d) control bars connected to and between the skeleton pivot pins; and
   (e) an actuator connected to the control bars at one end of one of the control bars,
   whereby actuation of the actuator moves the control bars causing arcuate rotation of the arcuate slotted plates for moving the at least two end-to-end grate inserts closer together and farther apart.

16. The grates control assembly of claim 15, wherein one of the grate inserts carries curved fingers at the one end and the second grate inserts carries straight fingers interlaced between the curved fingers wherein actuation of the actuator moves the interlaced fingers closer together or farther apart for different sized grain.

17. The grates control assembly of claim 15, wherein the skeleton carries 3 grate inserts in end-to-end abutting relationship about 270°.

18. The grates control assembly of claim 17, wherein the skeleton carries three sets of the 3 end-to-end grate inserts.

19. The grates control assembly of claim 15, wherein the actuator is one or more of manual or powered.

20. The grates control assembly of claim 19, wherein at least one of the grate inserts is moved manually and at least one of the grate inserts is moved by powered actuators.

21. The grates control assembly of claim 15, wherein movement of the grate inserts is in concert with movement of concaves inserts.

22. A concaves control assembly for a concaves assembly and a grates control assembly for a grates assembly comprising:
   (a) a concaves skeleton for receiving at least two concave inserts end-to-end;
   (b) at least two concave inserts inserted within the concaves skeleton for threshing grain in concert with a rotor assembly;
   (c) concaves rotatable plates having arcuate slots, located where the at least two concave inserts meet, and carried by and rotatable with concaves skeleton pivot pins; and
   (d) concaves control bars connected to and between the concaves skeleton pivot pins; and
   (e) an actuator connected to the control bars at one end of one of the concaves control bars;
   (f) a grates skeleton for receiving at least two grate inserts end-to-end;
   (g) at least two grate inserts inserted within the grates skeleton for separating grain in concert with a rotor assembly;
   (h) grates rotatable plates having arcuate slots, located where the at least two grate inserts meet, and carried by and rotatable with grates skeleton pivot pins; and
   (i) grates control bars connected to and between the grates skeleton pivot pins; and
   (j) a grates actuator connected to the grates control bars at one end of one of the grates control bars,
   whereby actuation of the concaves actuator moves the concaves control bars causing arcuate rotation of the concaves arcuate slotted plates for moving the at least two end-to-end concave inserts closer together and farther apart, and
   whereby actuation of the grates actuator moves the grates control bars causing arcuate rotation of the grates arcuate slotted plates for moving the at least two end-to-end grate inserts closer together and farther apart.

23. The concaves control assembly for a concaves assembly and a grates control assembly for a grates assembly of claim 22, wherein at least one of the grate inserts is moved manually and at least one of the grate inserts is moved by powered actuators.

24. The concaves control assembly for a concaves assembly and a grates control assembly for a grates assembly of claim 22, wherein a single actuator moves both the concaves inserts and the grates inserts.

* * * * *